United States Patent
Lamba et al.

(10) Patent No.: US 8,019,356 B2
(45) Date of Patent: Sep. 13, 2011

(54) LOCATION BASED TRACKING

(75) Inventors: Gaurav Lamba, Sunnyvale, CA (US); Alejandro R Holcman, San Diego, CA (US); James Douglass DeLoach, Jr., Los Altos, CA (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 646 days.

(21) Appl. No.: 12/109,308

(22) Filed: Apr. 24, 2008

(65) Prior Publication Data

US 2008/0268869 A1  Oct. 30, 2008

Related U.S. Application Data

(60) Provisional application No. 60/914,222, filed on Apr. 26, 2007.

(51) Int. Cl.
*H04W 4/00* (2009.01)

(52) U.S. Cl. ............... 455/456.1; 455/456.2; 455/456.3; 342/357.29

(58) Field of Classification Search ............... 455/456.1, 455/456.3, 456.2; 342/357.29
See application file for complete search history.

(56) References Cited

U.S. PATENT DOCUMENTS 5,982,324 A * 11/1999 Watters et al. ........... 342/357.29
6,798,376 B2    9/2004 Shioda et al.

FOREIGN PATENT DOCUMENTS

| EP | 1455198 | 9/2004 |
|----|---------|--------|
| EP | 1626288 | 2/2006 |
| WO | 2005010549 | 2/2005 |

OTHER PUBLICATIONS

International Search Report—PCT/US08/061655, International Search Authority—European Patent Office—Jul. 30, 2008.
Written Opinion—PCT/US08/061655, International Search Authority—European Patent Office—Jul. 30, 2008.

* cited by examiner

*Primary Examiner* — Pierre-Louis Desir
(74) *Attorney, Agent, or Firm* — Linda G. Gunderson; Mary A. Fales (57) ABSTRACT

The subject matter disclosed herein relates to obtaining position fixes using a position determination method in response to a change in an RF environment.

22 Claims, 5 Drawing Sheets

LOCATION BASED TRACKING

RELATED APPLICATIONS

This application claims benefit of priority of U.S. Provisional Patent Application Ser. No. 60/914,222, filed on Apr. 26, 2007, which is hereby incorporated by reference in its entirety.

BACKGROUND

1. Field

The subject matter disclosed herein relates to obtaining position fixes using a position determination method in response to a change in a radio frequency (RF) environment.

2. Information

A satellite positioning system (SPS) typically comprises a system of transmitters positioned to enable entities to determine their location on the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellites. For example, a satellite in a constellation of a Global Navigation Satellite System (GNSS) such as Global Positioning System (GPS), Galileo, Glonass, or Compass may transmit a signal marked with a PN code that is distinguishable from PN codes transmitted by other satellites in the constellation.

To estimate a position at a receiver, a navigation system may determine pseudorange measurements to satellites "in view" of the receiver using well known techniques based, at least in part, on detections of PN codes in signals received from the satellites. Such a pseudorange to a satellite may be determined based, at least in part, on a code phase detected in a received signal marked with a PN code associated with the satellite during a process of acquiring the received signal at a receiver. To acquire the received signal, a navigation system typically correlates the received signal with a locally generated PN code associated with a satellite. For example, such a navigation system typically correlates such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Figure 1:
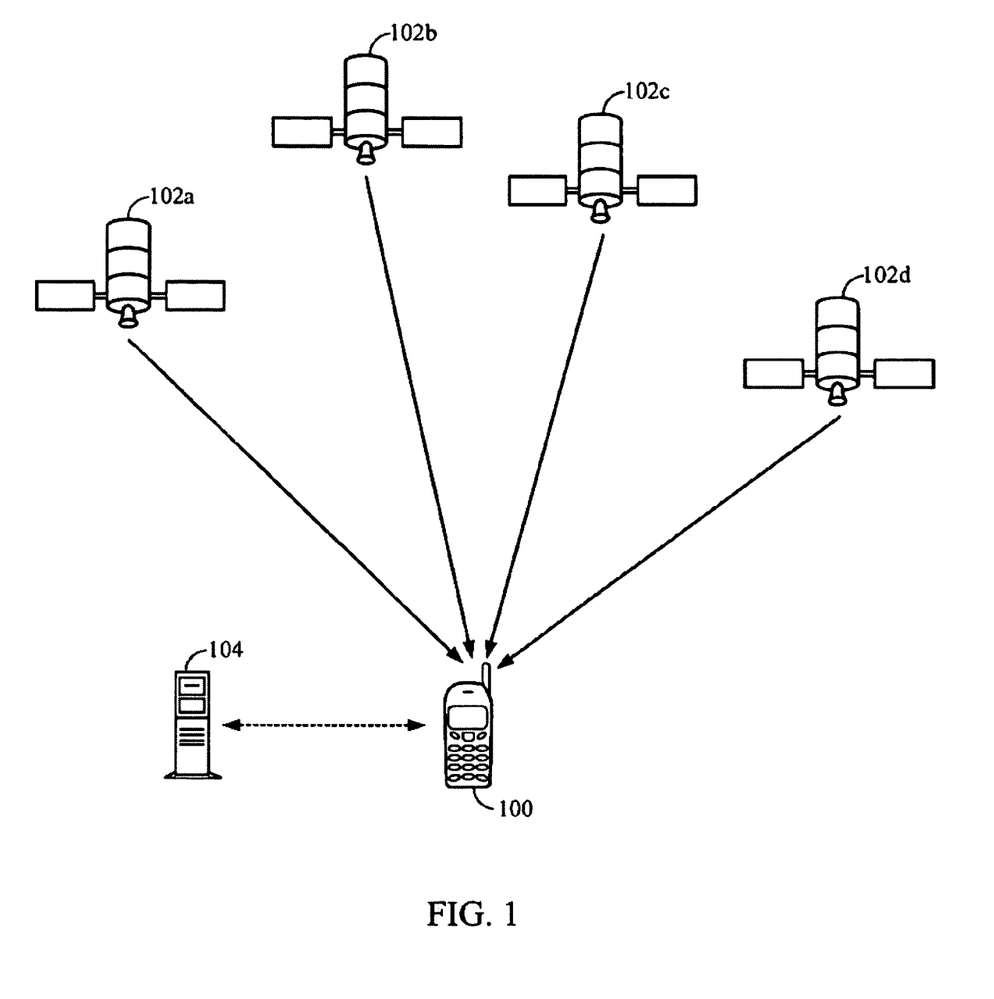
FIG. 1 is a schematic diagram of a satellite positioning system (SPS), according to one aspect.

FIG. 1 illustrates an application of an SPS system, whereby a mobile station (MS) 100 in a wireless communications system may receive transmissions from satellites 102a, 102b, 102c, 102d in the line of sight to MS 100, and derives time measurements from a plurality of such transmissions. MS 100 may provide such measurements to location server 104, which may determine the position of the station from the measurements. Location server 104 may comprise any one of several platforms capable of determining the position of MS 100 including, for example, a position determination entity (PDE), serving mobile location center (SMLC), stand-alone SMLC (SAS) or a SUPL location platform (SUPL), just to name a few examples. Alternatively, MS 100 may determine its own position independently of such a location server.

MS 100 may search for a transmission from a particular satellite by correlating the PN code for the satellite with a received signal. The received signal typically comprises a composite of transmissions from one or more satellites within a line of sight to a receiver at MS 100 in the presence of noise.

Though MS 100 may be capable of determining its position from received satellite transmission signals, buildings or other structures may "block" such signals, for example. In other words, whether or not a sufficient number of SPS satellites are in view of MS 100 may depend, at least in part, on the radio frequency (RF) environment of MS 100. In such an RF environment that may prevent MS 100 from acquiring signals from SPS satellites, determination of the position of MS 100 may instead be facilitated through communication with location server 104. Here, for example, MS 100 may obtain pseudorange measurements to terrestrial base stations using advanced forward link trilateration (AFLT) and forward such pseudorange measurements and other information (e.g., pseudorange measurements to one or more SPS satellites) to location server 104. Alternatively, MS 100 may employ other techniques for obtaining measurements for use in determining a range to a terrestrial base station such as, for example, observed time difference of arrival (OTDOA), enhanced observed time difference (E-OTD) and uplink time difference of arrival (U-TDOA), just to name a few examples.

BRIEF DESCRIPTION OF THE FIGURES

Non-limiting and non-exhaustive features will be described with reference to the following figures, wherein like reference numerals refer to like parts throughout the various figures.

SUMMARY

In one particular implementation, a device is adapted to transition from obtaining one or more position fixes using a first position determination method to obtain one or more position fixes using a second position determination method in response to a first change in an RF environment. It should be understood, however, that this is merely one example implementation and that claimed subject matter is not limited to this particular implementation.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices designed to perform the functions described herein, and/or combinations thereof.

For a firmware and/or software implementation, methodologies may be implemented with modules (e.g., procedures, functions, and so on) that perform the functions described herein. Any machine-readable medium tangibly embodying instructions may be used in implementing the methodologies described herein. For example, software codes may be stored in a memory, for example the memory of a mobile station, and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

A "space vehicle" (SV) as referred to herein relates to an object that is capable of transmitting signals to receivers on the Earth's surface. In one particular example, such an SV may comprise a geostationary satellite. Alternatively, an SV may comprise a satellite traveling in an orbit and moving relative to a stationary position on the Earth. However, these are merely examples of SVs and claimed subject matter is not limited in these respects.

Position determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such position determination techniques described herein may also be used for any combination of WWAN, WLAN and/or WPAN.

Techniques described herein may be used with any one of several SPSs and/or combinations of SPSs. Furthermore, such techniques may he used with positioning determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with time. Such a transmitter may be assigned a unique PN code so as to permit identification by a remote receiver. Pseudolites may be useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

An entity such as a wireless terminal may communicate with a network to request data and other resources. A mobile station (MS), including a cellular telephone, a personal digital assistant (PDA), or a wireless computer are just a few examples of such an entity. Communication of such an entity may include accessing network data, which may tax resources of a communication network, circuitry, or other system hardware. In wireless communication networks, data may be requested and exchanged among entities operating in the network. For example, an MS may request data from a wireless communication network to determine the position of the MS operating within the network: data received from the network may he beneficial or otherwise desired for such a position determination. However, these are merely examples of data exchange between an MS and a network in a particular aspect, and claimed subject matter is not limited in these respects.

In an implementation, utilizing SPS satellite transmission signals, an MS may attempt to obtain one or more position fixes using a first position determination method. Such an MS may automatically transition to a second position determination method in response to detection of a change in an RF environment. For example, an MS having a clear view of SPS satellites may attain position fixes from time to time using an MS-based determination method, which will be discussed below. If the MS, however, is carried into a building, for example, MS-based position fixes may not be possible due to an RF environment that limits reception of SPS signals at the MS. In such a case, the MS may automatically transition from an MS-based determination method to another position determination method, such as an MS-assisted position determination method, which is also described below. As described below according to particular implementations, the MS may transition to such an alternative position method in response to detection of a change in an RF environment evidence by a history of attempts to obtain one or more position fixes using the MS-based determination method.

Because a particular position determination method may include an associated cost, e.g., a fixed cost per use, it may be desirable to limit use of such a method. Accordingly, processes to determine and modify use of one or more position determination methods are discussed below.

As in at least one implementation mentioned above, utilizing SPS satellite transmission signals, an MS 100 (FIG. 1) may determine its position using pseudorange measurements to SVs and/or other information obtained from communication with a location server (such as location server 104, for example), through a communication network, for example. In an MS-based (MSB) position mode, according to one particular example, position for MS 100 may be determined at MS 100 based upon pseudorange measurements to SVs obtained at MS 100 without communication with a location server. On the other hand, position information for MS 100 in an MS-assisted (MSA) position mode may be determined at a location server instead of at MS 100, thus using resources of a communication network to facilitate communication between MS 100 and the location server. In this case, position information may then be transmitted from location server 104 to MS 100. In one particular implementation, an MSA position mode may employ Advanced Forward Link Trilateration (AFLT) to obtain pseudorange measurements to terrestrial base stations. MS 100 may forward such pseudorange measurements, along with other information, to location server 104 where a position of MS 100 may be determined. Alternatively, MS 100 may employ any of the aforementioned observed time difference of arrival (OTDOA), enhanced observed time difference (E-OTD) and uplink time difference of arrival (U-TDOA) techniques for obtaining measurements for use in determining ranges to terrestrial base stations, and forward such measurements to location server 104 for estimating a position of MS 100. Use of such an MSA mode may enable a fix if, for example, MS 100 is not in a favorable RF environment to acquire a sufficient number of SPS signals from SVs for a position fix, but is nevertheless able to communicate with location server 104, for example.

In MSA mode according to a particular implementation, MS 100 may from time to time communicate with location server 104 to receive location information for a position fix. Because at least a portion of a communication network's resources, including location server 104, may be occupied by such a communication, it may be desirable to reduce the number of position fixes using such network resources. For example, in a particular implementation, a network carrier may desire to reduce the number of MSA position fixes for which MS 100 communicates with the network, during, say, a location based services (LBS) tracking session for the MS. In one aspect, reducing a number and/or rate of MSA position fixes during an LBS tracking session may include a geofencing LBS application. In this context, the term geofencing may refer to demarcation of an area defined by location; e.g., an area that is bound by a perimeter comprising, for example, a certain radius around a central point. Such an application will be described below in detail.

In another aspect, a "throttling" process may enable a reduction in use of network resources by reducing a rate of MSA position fixes by an MS, for example. In a particular example, MS 100 may obtain position fixes in an MSB position mode while in desirable RF environments, and control if and when an MS transitions to obtaining position fixes in an MSA mode while in undesirable RF environments. Such control may include a process that reduces use of network resources. Such a reduction may, for example, increase a data capacity of a network, such as increased network spectra and IP address pools, just to name a few examples. Also, a throttling process may reduce power consumption, and thus improve battery life for example, of an MS.

Figure 2:
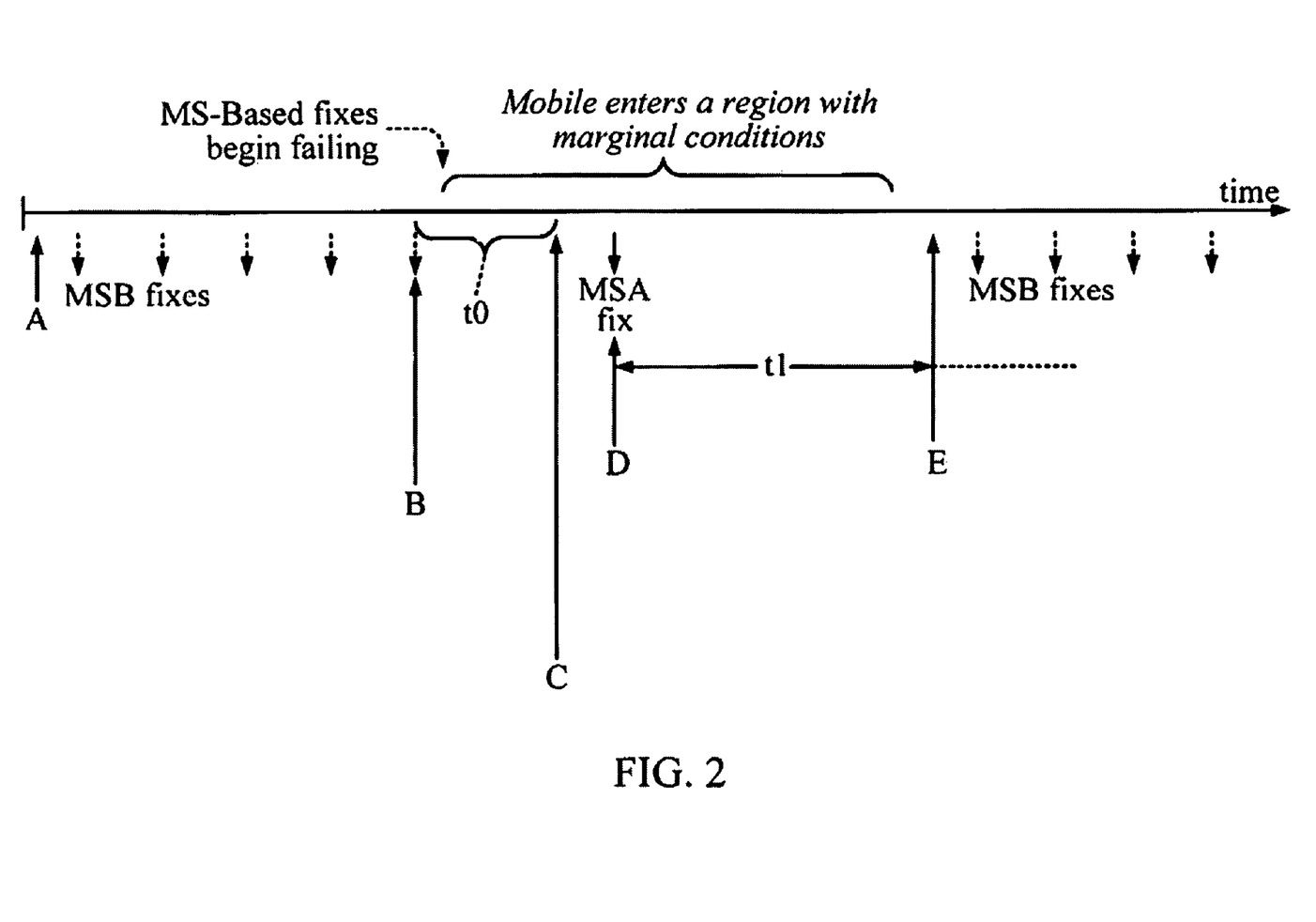
FIG. 2 is a schematic diagram of a timeline for one aspect of a mobile station subjected to favorable and unfavorable RF environments, according to one implementation.

FIG. 2 is a schematic diagram of a timeline for an MS, such as MS 100 shown in FIG. 1, for example, subjected to favorable and unfavorable RF environments, according to one implementation. At the left portion of the horizontal timeline, at time A, an MS is shown to be operating in an MS-based mode, assuming an RF environment that permits position fixes while operating in the MS-based mode. An MS may periodically initiate attempts to obtain position fixes using an MS-based mode, for example, every second. At time B, MS-based position fixes may begin to fail. This may occur, for example, if an MS enters an RF environment with marginal conditions for receiving or processing SPS signals, such as, but not limited to, indoors or an urban canyon. During an interval of time t0 between times B and C, an MS may continue to attempt MS-based fixes one or more times by receiving or processing an SPS signal. If such attempts are unsuccessful, say a given number of consecutive times, then an MS may automatically transition to an MS-assisted position mode. Here, this is one particular example of automatically transitioning to an alternative position determination method in response to detection of a change in an RF environment based, at least in part on a history of attempts to obtain a position fix, and claimed subject matter is not limited in this respect. In a particular example, the time interval t0 may be a constant or may be determined according to an algorithm based on such variables as the number of consecutive times that MS-based fixes are unsuccessful over a given time interval, for example. In a specific implementation, interval t0, beginning from the time when an MS-based position fix fails, at time B, may be thirty or more seconds during which failed attempts at MS-based fixes continue, but this is only an example to which claimed subject matter is not limited. For example, the process described above is merely one way to determine a change in an RF environment.

After interval t0, as mentioned above, an MS may automatically transition to an MS-assisted position mode, indicated as "MSA fix" on the timeline at time D. Here, a single MS-assisted position fix may be attempted, though additional MSA position fixes may be performed in other implementations. At time E, a time interval t1 after the MS-assisted fix at time D, an MS-based fix may be attempted, indicated as "MSB fixes" on the timeline. Such an interval t1 may be a constant or may be a variable as determined according to a geofencing LBS or throttling process, mentioned above, for example. Of course, these processes are only examples, and claimed subject matter is not limited in this respect.

At time E, if the MS-based position fix is successful, an MS may automatically continue in MS-based mode, such as at time A. By successfully fixing at time E, another change in RF environment may be detected. It should be understood, however, that this is merely one particular example of how a change in an RF environment may be detected according to a particular implementation and claimed subject matter is not limited in this respect. If, however, the MS-based position fix is unsuccessful, an MS may continue with an MS-assisted position fix, such as at time D. Thereafter, interval t1 may be increased to a value greater than its previous value before attempting to transition back to MS-based mode, at time E, for example. In other words, time interval t1, which starts at an MS-assisted position fix at time D, may be lengthened to a greater value than the previous time interval t1, which started at the previous MS-assisted fix. In this manner, position fix requests to a network, such as location server 104, may be reduced by increasing the time interval between consecutive MS-assisted position fixes while time D repeats in response to continued failure of MS-based fixes at time E. After such an increased time interval, an MS-based position fix may again be attempted at time E, and such a process may repeat according to whether the MS-based position fix at time E is successful or not, as described above. This process will be explained in more detail below.

In a particular implementation, a process may be used to successively increase time interval t1 for each subsequent MS-assisted position fix. Such a process may include a process of changing time interval t1 in an exponential fashion, for example, or by changing t1 based upon values and/or other variables of a system that includes an MS and/or a network. Such system variables may include, for example, an amount of network traffic, capacity of network resources, MS user settings, or MS user history stored in a system memory, just to name a few examples. In one particular implementation, time interval t1 may be increased, as in the process described above, to a maximum value.

Figure 3:
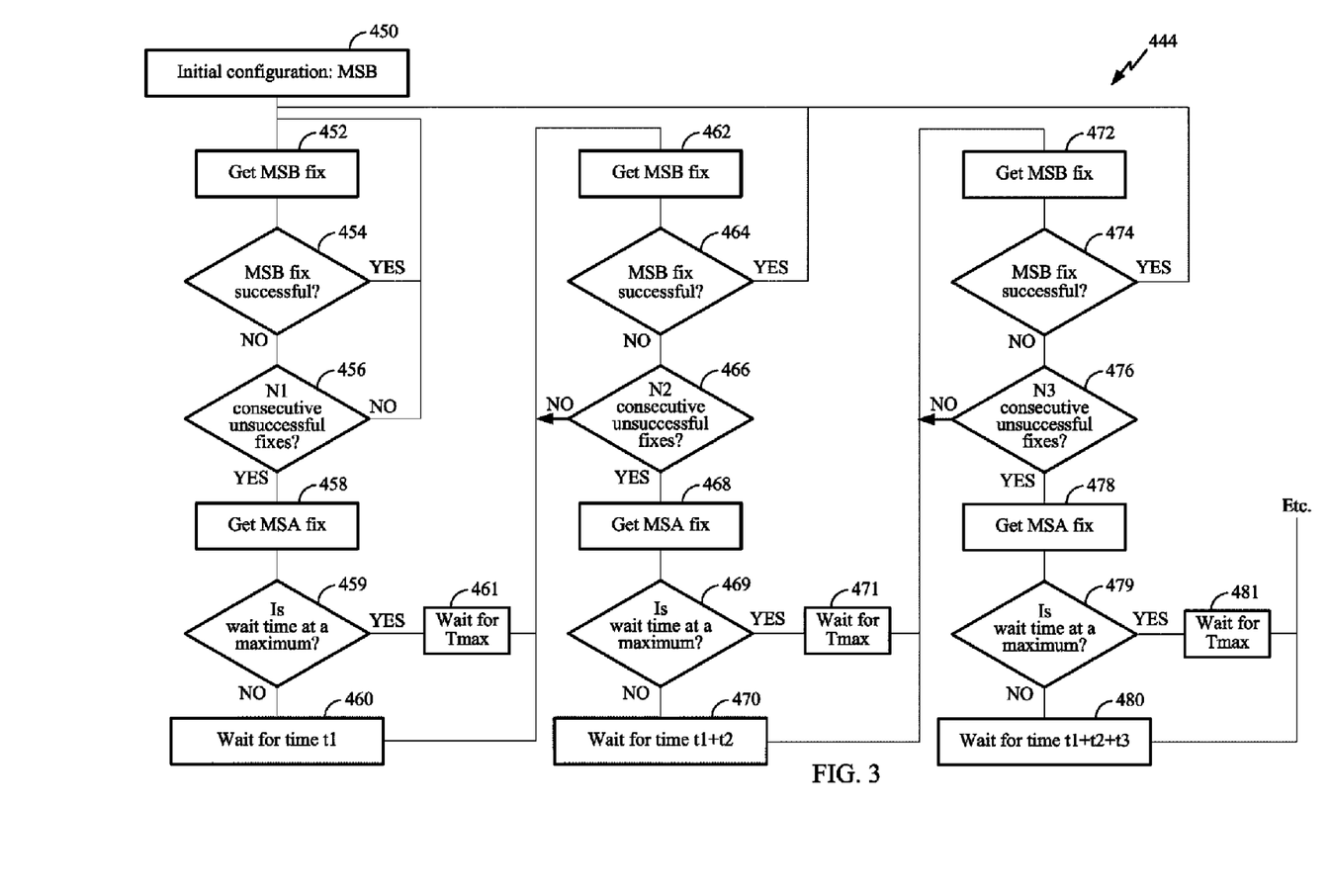
FIG. 3 is a flow chart showing a process for reducing the rate of MSA fixes, according to one implementation.

FIG. 3 is a flow chart showing a process 444 for reducing a rate of MSA position fixes, according to one implementation. At block 450, an MS, such as MS 100 shown in FIG. 1, may be initially configured to operate in a mobile station-based (MSB) position mode. Such a mode, as mentioned above, may include a stand-alone mode, wherein an MS determines its own position without utilizing location server 104, for example.

An MS may continue to operate in MSB mode, as at block 452, as it successfully receives MSB position fixes. An MS may initiate such position fixes periodically, for example. At block 454, a determination is made whether or not the MSB position fix of block 452 was successful. If so, then an MS may continue to operate in MSB mode, returning to block 452, as the process of initiating MSB position fixes repeats. If, however, the MSB position fix of block 452 was not successful, e.g., because of a change in RF environment, then process 444 proceeds to block 456 where the number of consecutive unsuccessful MSB position fixes may be counted up to a number N1. Process 444 may omit such counting of consecutive unsuccessful MSB position fixes, e.g., N1 may equal one. Of course, this is merely an example, and claimed subject matter is not limited by such examples. Returning to explaining block 456, if the number of consecutive unsuccessful MSB position fixes is below a number N1, an MS may continue to initiate MSB position fixes as blocks 452 through 456 repeat. On the other hand, if the number of consecutive unsuccessful MSB position fixes reaches number N1, which may occur, for example, if an MS operates in an undesirable RF environment for an extended period, process 444 may proceed to block 458 where an MS transitions from obtaining position fixes using MSB mode to obtaining position fixes using an MSA mode. In MSA mode, an MS may initiate an MSA position fix in order to acquire a position fix even in the presence of undesirable RF environments. Next, at block 460, process 444 may include a waiting interval of interval t1, which is also shown in FIG. 2. During waiting interval t1, no position fixes may be initiated. Accordingly, resources of location server 104 may not be burdened with MSA position fix requests during interval t1.

At block 462, an MS initiates an MSB position fix after interval t1 ends. At block 464, a determination is made whether or not the MSB position fix of block 462 was successful, which may indicate a change in RF environment. If so, then an MS may continue to operate in MSB mode, returning to block 452, as the process of initiating MSB position fixes repeats. If, however, the MSB position fix of block 462 was not successful, then process 444 proceeds to block 466 where the number of consecutive unsuccessful MSB position fixes may be counted up to a number N2. Process 444 may omit such counting of consecutive unsuccessful MSB position fixes, e.g., N2 may equal one. If the number of consecutive unsuccessful MSB position fixes is below number N2, then an MS may continue to initiate MSB position fixes as blocks 462 through 466 repeat. On the other hand, if the number of consecutive unsuccessful MSB position fixes reaches number N2, which may occur, for example, if an MS operates in an undesirable RF environment for an extended interval, then process 444 may proceed to block 468 Where an MS transitions from obtaining position fixes using MSB mode to obtaining position fixes using MSA mode. In MSA mode, an MS may initiate an MSA position fix in order to acquire a position fix even during undesirable RF environments. Next, at block 470, process 444 includes a waiting period of interval t1+t2, wherein t2 is a time increase above interval t1, which is the first waiting interval, shown at block 460. During the waiting interval, no position fixes may be initiated. Accordingly, network resources used in communication with location server 104 may not be burdened with MSA position fix requests during this interval. In the particular implementation of process 444, the increasing nature of the waiting interval, such as interval t1 at block 460 and interval t1+t2 at block 470, may effectively decrease a rate of MSA position fix requests made to location server, for example.

At block 472, an MS initiates an MSB position fix after interval t1+t2 ends. At block 474, a determination is made as to whether or not the MSB position fix of block 472 was successful, which may indicate a change in RF environment. If so, then an MS may continue to operate in MSB mode, returning to block 452, as the process of initiating MSB position fixes repeats. If, however, the MSB fix of block 472 was not successful, then process 444 may proceed to block 476 where the number of consecutive unsuccessful MSB fixes may be counted up to a number N3. Process 444 may omit such counting of consecutive unsuccessful MSB position fixes, e.g., N3 may equal one. Of course, this is merely an example of a process to determine a change in an RF environment, and claimed subject matter is not limited by such examples. If the number of consecutive unsuccessful MSB fixes is below number N3, then MS 100 may continue to initiate MSB position fixes as blocks 472 through 476 repeat. On the other hand, the number of consecutive unsuccessful MSB position fixes may reach number N3, which may occur, for example, if an MS operates in an undesirable RF environment for an extended interval. In such a case, process 444 may proceed to block 478 where an MS transitions from obtaining position fixes using MSB mode to obtaining position fixes using MSA mode. In MSA mode, an MS may initiate an MSA fix in order to acquire a position fix even during undesirable RF environments. Next, at block 480, process 444 includes a waiting interval of time t1+t2+t3, wherein time t3 is the time increase above waiting interval t1+t2, which was the previous waiting interval, shown at block 470. During the waiting interval, no position fixes may be initiated. Accordingly, resources of location server 104 may not be burdened with MSA position fix requests during this interval. In the particular implementation of process 444, the increasing nature of the waiting interval, such as t1 at block 460, t1+t2 at block 470, and t1+t2+t3 may effectively decrease the rate of MSA position fix requests made to location server for example.

Process 444 may continue in a repeating fashion while MSB position fixes remain unsuccessful. For example, each time an MSB position fix fails, or a number of consecutive MSB position fixes fail, as at blocks 456, 466, and 476, process 444 may include initiating an MSA position fix followed by a waiting interval. Each such waiting interval is lengthened beyond its previous value such that (t1+t2+t3)> (t1+t2) >t1. Lengths of such consecutive waiting intervals may be determined from a look-up table in a memory 404 (FIG. 6), or calculated using an algorithm, just to name a few examples. Such an algorithm may increase each consecutive waiting interval linearly, exponentially, or by any other mathematical relation, for example. Process 444 may include a maximum length Tmax for the waiting interval, as mentioned above. At blocks 459, 469, and 479 in process 444 may determine whether an algorithm has reached a waiting interval equal to or greater than Tmax, for example. If not, then a waiting interval at blocks 460, 470, and 480 may occur. If, however, Tmax has been reached or exceeded, a maximum wait time of Tmax, at block 461, 471, and 481 may occur. For example, a maximum waiting interval Tmax may be four times t1. Also, N1, N2, and N3 may each be equal to one or greater. In one particular implementation, N1=N2=N3=1, so that an MSA position fix will occur, as at blocks 458, 468, and 478, for example, after only one unsuccessful position fix. Of course, claimed subject matter is not limited to these examples, which are only described here to help illustrate various implementations.

As mentioned above, lengthening waiting intervals before retrying an MSB position fix may reduce a burden on network resources used in communicating with location server 104 by increasing the time between MSA fixes.

Figure 4:
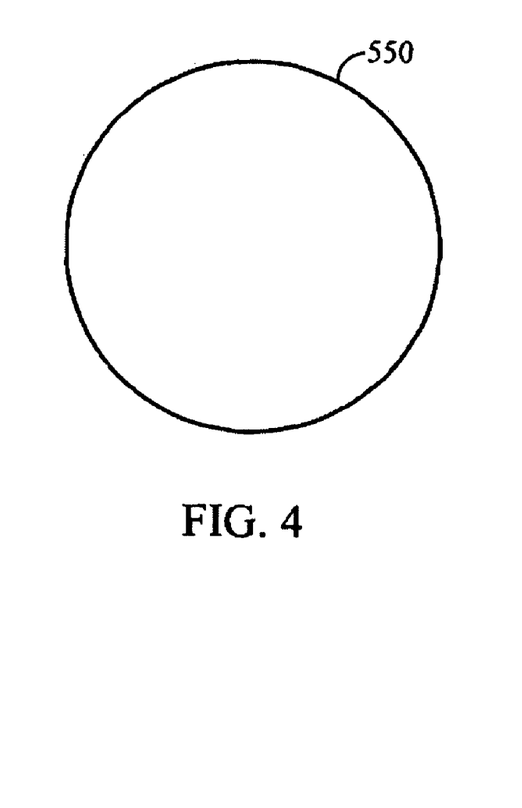
FIG. 4 is a schematic diagram showing a geofence, according to one implementation.

FIG. 4 is a schematic diagram showing a geofence 550, according to an implementation. As mentioned above, the term geofence may refer to demarcation of an area defined by location. In a particular implementation, an MS, such as MS 100 shown in FIG. 1, may operate responsive, at least in part, to its location relative to geofence 550. For example, an MS may reduce the rate that it initiates MSA location fixes while operating within geofence 550. Accordingly, waiting interval t1, as described in the implementation of FIG. 2 or process 444 of FIG. 3, may be determined based at least in part on whether an MS is inside or outside geofence 550. To describe a specific example, if an MS is outside geofence 550, then t1 may be 30 seconds. If an MS is in inside geofence 550, then t1 may be 45 seconds. Such a longer t1 inside geofence 550 may reflect the fact that less frequent position fixes may be acceptable while an MS is within a known location, i.e., geofence 550. In other words, the location of geofence 550 may provide information regarding the location of an MS if it is within geofence 550. For example, geofence 550 may define an area inside a large shopping mall, which may be an area where one would expect an MS to travel at or below walking speed. Such an MS may include a cell phone or a PDA in a walking shopper's pocket, for example. In contrast, an MS may travel at highway speeds, in this example, outside geofence 550, where an MS may include a cell phone or a PDA in an automobile. Accordingly, within geofence 550, an MS may travel a relatively short distance during waiting interval t1 compared to travel distance outside of geofence 550, where higher speed may occur. Therefore, in a particular implementation, for a given location uncertainty, waiting interval t1 may be longer if an MS is within geofence 550 than if an MS is outside geofence 550. As mentioned above, a longer waiting interval t1 implies a reduced rate of MSA location fixes and a reduced burden on network resources used in communicating with a location server, for example.

Figure 5:
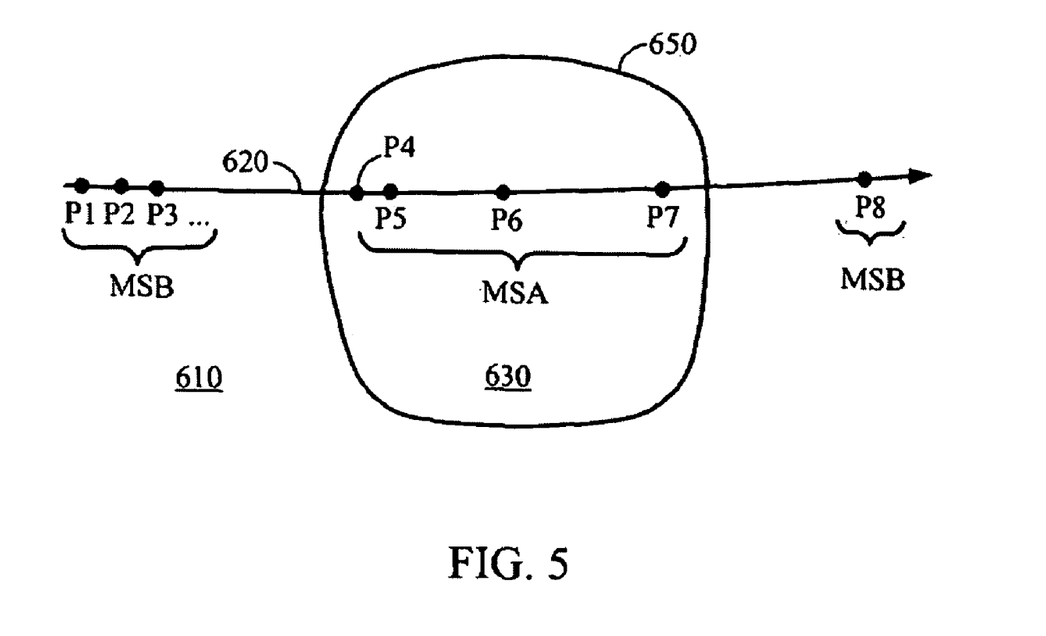
FIG. 5 is a schematic diagram showing a mobile station trajectory through varying RF environments, according to one implementation.

FIG. 5 is a schematic diagram showing an MS trajectory 620 through varying RF environments, according to one implementation. Boundary 650 between region 610 and region 630 may represent a transition from a first RF environment to a second RF environment. For example, region 610 may include a desirable RF environment enabling an MS, such as MS 100 shown in FIG. 1, to attain MSB position fixes because a sufficient number of SPS satellites may be "in view" of the MS. In contrast, region 630 may include an undesirable RF environment that prevents an MS from attaining MSB position fixes. Such an undesirable RF environment may occur indoors or in an urban canyon, for example.

In the implementation of FIG. 5, an MS may engage in MSB position fixes, as at block 452 of FIG. 3, for example, as it travels through points P1, P2, P3, and so on along route 620 in region 610, which allows such MSB fixes. At each point, an MS may determine, as at block 454, whether the MSB position fix at that point was successful. Such success is assumed in the implementation of FIG. 5 in region 610. Accordingly, an MS may continue to operate in MSB mode. But at point P4 along route 620, an MS has traveled into region 630 having an RF environment that prevents successful MSB fixes. Accordingly, an MS may attempt and fail to attain MSB position fixes N1 times, as at block 456 of FIG. 3. After such failure, an MS may transition from MSB mode to MSA mode at point P5 along route 620. In MSA mode, an MS may attain an MSA position fix, perhaps utilizing a location server 104, for example.

An MS may travel from point P5 to point P6 during a waiting interval t1, as at block 460, for example. At point P6, an MS may attempt an MSB position fix. Since an MS is still in region 630 having an undesirable RF environment, this MSB position fix will fail, in this particular example. Accordingly, an MS may initiate an MSA position fix, after which a waiting interval may occur, which will be lengthened compared to the previous waiting interval. Such a lengthened waiting interval may be indicated at block 470 of FIG. 3, for example. After this longer waiting interval, during which an MS travels from point P6 to point P7, another attempt may be made at acquiring an MSB position fix. As in the previous attempt at point P6, an MS may attempt an MSB position fix at point P7. Since an MS is still in region 630 having an undesirable RF environment, this MSB position fix will fail, in this particular example. Accordingly, an MS may initiate an MSA position fix, after which a waiting interval may occur, which will be lengthened compared to the previous waiting interval. Such a lengthened waiting interval may be indicated at block 480 of FIG. 3, for example. After this longer waiting interval, during which an MS travels from point P7 to point P8, another attempt is made at acquiring an MSB position fix. During the latest waiting interval, an MS traveled into region 610 having a desirable RF environment. Accordingly, the attempt at acquiring an MSB position fix at point P8 may be successful. With this success, an MS may transition from MSA mode to MSB mode at point P8. In MSB mode, an MS may attain MSB position fixes while in region 610, for example.

Figure 6:
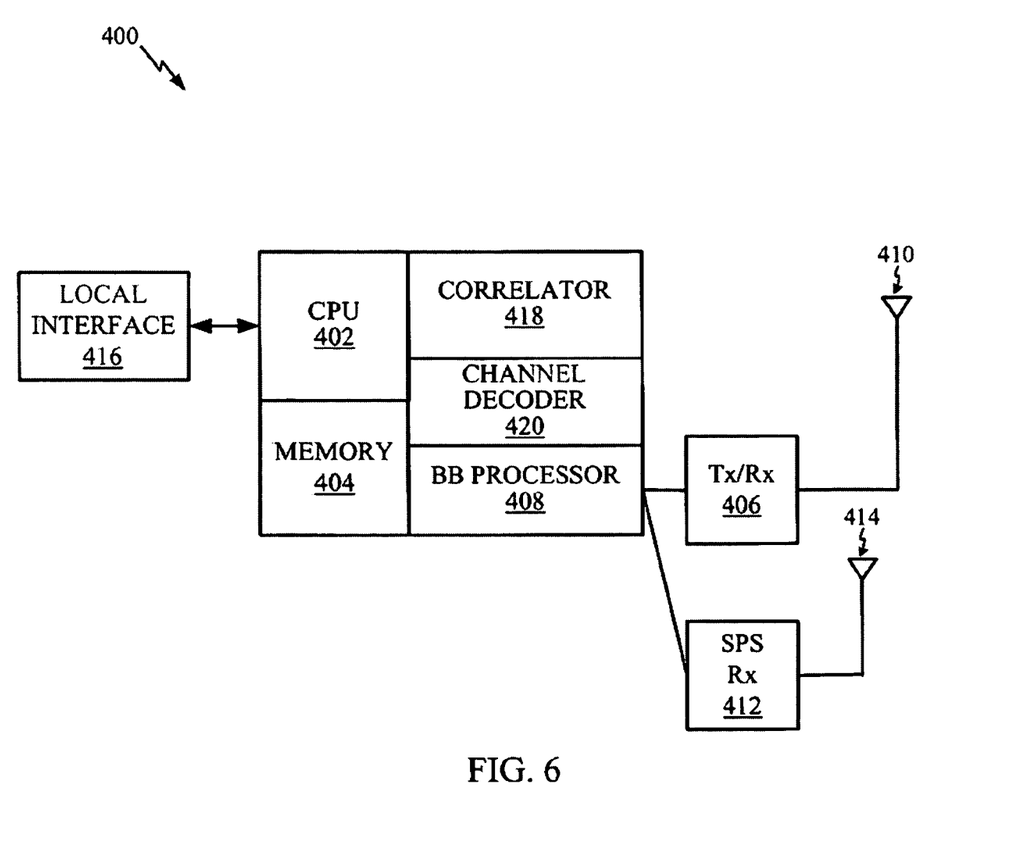
FIG. 6 is a schematic diagram of a device capable of communication with a wireless network, according to one implementation.

FIG. 6 is a schematic diagram of a device capable of communication with a wireless network, according to one implementation. In a particular implementation, an MS, such as MS 100 shown in FIG. 1, may comprise a device 400 as shown in FIG. 6, which is capable of processing SPS signals received at an antenna 414 for determining pseudorange measurements and communicating with a wireless communication network through antenna 410. Here, a radio transceiver 406 may be adapted to modulate an RF carrier signal with baseband information, such as data, voice and/or SMS messages, onto an RF carrier, and demodulate a modulated RF carrier to obtain such baseband information. Antenna 410 may be adapted to transmit a modulated RF carrier over a wireless communications link and receive a modulated RF carrier over a wireless communications link.

Baseband processor 408 may be adapted to provide baseband information from central processing unit (CPU) 402 to transceiver 406 for transmission over a wireless communications link. Here, CPU 402 may obtain such baseband information from a local interface 416 which may include, for example, environmental sensory data, motion sensor data, altitude data, acceleration information (e.g., from an accelerometer), proximity to other networks (e.g., ZigBee, Bluetooth, WiFi, peer-to-peer). Such baseband information may also include position information such as, for example, an estimate of a position of device 400 and/or information that may be used in computing same such as, for example, pseudorange measurements.

SPS receiver (SPS Rx) 412 may be adapted to receive and demodulate transmissions from SVs, and provide demodulated information to correlator 418. Correlator 418 may be adapted to derive correlation functions from the information provided by SPS receiver 412. Correlator 418 may also be adapted to derived pilot-related correlation functions from information relating to pilot signals provided by transceiver 406. This information may be used by device acquire a wireless communications network.

Channel decoder 420 may be adapted to decode channel symbols received from baseband processor 408 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 420 may comprise a turbo decoder.

Memory 404 may be adapted to store machine-readable instructions which are executable to perform one or more of processes, examples, implementations, or examples thereof which have been described or suggested. CPU 402 may be adapted to access and execute such machine-readable instructions. However, these are merely examples of tasks that may be performed by a CPU in a particular aspect and claimed subject matter is not limited in these respects.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method in a mobile station, the method comprising:
   transitioning from obtaining one or more position fixes using a first position determination method to obtaining one or more position fixes using a second position determination method automatically and in response to detection of a first change in an RF environment based, at least in part, on a history of attempted position fixes;
   transitioning from obtaining one or more position fixes using said second position determination method to obtaining one or more position fixes using said first position determination method automatically and in response to detection of a second change in said RF environment;
   waiting a first duration before said transitioning from obtaining one or more position fixes using said second position determination method to obtaining one or more position fixes using said first position determination method; and
   obtaining one or more position fixes using said second position determination method for a second duration before said transitioning from said second position determination method to said first position determination method, wherein said second duration is longer than said first duration, in response to failure of said first position determination method to obtain one or more position fixes following waiting said first duration.

2. The method of claim 1, wherein said transitioning from obtaining one or more position fixes using said second position determination method to obtaining one or more position fixes using said first position determination method further comprises:
   detecting said second change in said RF environment in response to one or more successful attempted position fixes obtained using said first position determination method.

3. The method of claim 1, wherein said first position determination method comprises:
   receiving data from a location server; and
   determining a position fix at said mobile station based, at least in part, on said received data.

4. The method of claim 1, wherein said first position determination method comprises:
   receiving data from navigation satellites; and
   determining a position fix at said mobile station based, at least in part, on said received data.

5. The method of claim 1, wherein said second position determination method comprises:
   determining a position fix at a location server; and
   receiving said position fix at said mobile station from said location server.

6. The method of claim 1, wherein said first change in said RF environment comprises a change from an RF environment that allows obtaining a position fix at said mobile station using pseudorange measurements to satellite vehicles to an RF environment that prevents obtaining a position fix at said mobile station using said pseudorange measurements.

7. The method of claim 1, wherein said second change in said RF environment comprises a change from an RF environment that prevents obtaining a position fix at said mobile station using pseudorange measurements to satellite vehicles to an RF environment that allows obtaining a position fix at said mobile station using said pseudorange measurements.

8. The method of claim 1, wherein said failing to obtain a successful position fix comprises attempting two or more successive position fixes.

9. The method of claim 1, further comprising determining said second duration using a mathematical relationship based, at least in part, on said first duration.

10. The method of claim 9, wherein said mathematical relationship comprises an exponential relationship.

11. The method of claim 9, wherein said mathematical relationship comprises a linear relationship.

12. The method of claim 1, further comprising:
    defining a geo-fence; and
    determining said second duration based, at least in part, on whether or not a position fix is performed in said geo-fence.

13. The method of claim 1, further comprising:
    determining a velocity; and
    determining said second duration based, at least in part, on said velocity.

14. The method of claim 13, wherein said velocity is determined using two or more position fixes.

15. The method of claim 1, further comprising limiting said second duration to a maximum value.

16. A mobile station comprising:
    a receiver adapted to operate in an RF environment to receive one or more satellite positioning system (SPS) signals; and
    a transceiver adapted to communicate with a wireless communication network;
    wherein said mobile station is adapted to:
    transition from obtaining one or more position fixes based, at least in part, on said SPS signals using a first position determination method to obtaining one or more position fixes based, at least in part, on said SPS signals using a second position determination method using said transceiver automatically and in response to detection of a first change in said RF environment based, at least in part, on a history of attempted position fixes using said first position determination method;

transition from obtaining one or more position fixes based, at least in part, on said SPS signals using said second position determination method using said transceiver to obtaining one or more position fixes based, at least in part, on said SPS signals using said first position determination method automatically and in response to detection of a second change in said RF environment;

wait a first duration before said transitioning from obtaining one or more position fixes using said second position determination method to obtaining one or more position fixes using said first position determination method; and obtain one or more position fixes using said second position determination method for a second duration before said transitioning from said second position determination method to said first position determination method, wherein said second duration is longer than said first duration, in response to failure of said first position determination method to obtain one or more position fixes following waiting said first duration.

17. The mobile station of claim 16, wherein said mobile station is further adapted to detect said second change in said RF environment in response to one or more successful attempted position fixes obtained using said first position determination method.

18. A non-transitory computer readable storage medium comprising code for causing a computer to;

transition from obtaining one or more position fixes using a first position determination method to obtaining one or more position fixes using a second position determination method automatically and in response to detection of a first change in an RF environment based, at least in part, on a history of attempted position fixes using said first position determination method;

transition from obtaining one or more position fixes using said second position determination method to obtaining one or more position fixes using said first position determination method automatically and in response to detection of a second change in said RF environment;

wait a first duration before said transitioning from obtaining one or more position fixes using said second position determination method to obtaining one or more position fixes using said first position determination method; and obtain one or more position fixes using said second position determination method for a second duration before said transitioning from said second position determination method to said first position determination method, wherein said second duration is longer than said first duration, in response to failure of said first position determination method to obtain one or more position fixes following waiting said first duration.

19. The non-transitory computer-readable storage medium of claim 18, wherein the code further comprises code to:

detect said second change in said RF environment in response to one or more successful attempted position fixes obtained using said first position determination method.

20. The non-transitory computer-readable storage medium of claim 18, wherein said second position determination method comprises:

receiving data from a location server; and determining a position fix at a mobile station based, at least in paint, on said received data.

21. A mobile station comprising:

means for transitioning from obtaining one or more position fixes using a first position determination method to obtaining one or more position fixes using a second position determination method automatically and in response to detection of a first change in an RF environment based, at least in part, on a history of attempted position fixes using said first position determination method;

means for transitioning from obtaining one or more position fixes using said second position determination method to obtaining one or more position fixes using said first position determination method automatically and in response to detection of a second change in said RF environment;

means for waiting a first duration before said transitioning from obtaining one or more position fixes using said second position determination method to obtaining one or more position fixes using said first position determination method; and means for obtaining one or more position fixes using said second position determination method for a second duration before said transitioning from said second position determination method to said first position determination method, wherein said second duration is longer than said first duration, in response to failure of said first position determination method to obtain one or more position fixes following waiting said first duration.

22. The mobile station of claim 21, wherein said means for transitioning from obtaining one or more position fixes using said second position determination method to obtaining one or more position fixes using said first position determination method further comprises:

means for detecting said second change in said RF environment in response to one or more successful attempted position fixes obtained using said first position determination method.

* * * * *